H. B. BRYAN.
SPRING TIRE.
APPLICATION FILED OCT. 26, 1912.

1,109,198.

Patented Sept. 1, 1914.

Witnesses

Inventor
H. B. Bryan
By
Attorneys

UNITED STATES PATENT OFFICE.

HUGH B. BRYAN, OF JOHNSTON CITY, ILLINOIS, ASSIGNOR OF ONE-HALF TO LORENZO D. HOBBS, OF JOHNSTON CITY, ILLINOIS.

SPRING-TIRE.

1,109,198.  Specification of Letters Patent. Patented Sept. 1, 1914.

Application filed October 26, 1912. Serial No. 727,867.

*To all whom it may concern:*

Be it known that I, HUGH B. BRYAN, a citizen of the United States, residing at Johnston City, in the county of Williamson, State of Illinois, have invented certain new and useful Improvements in Spring-Tires; and I do hereby declare the following to be a full, clear, and exact description of the invention, such as will enable others skilled in the art to which it appertains to make and use the same.

This invention is directed to improvements in spring tires especially for use in connection with automobile wheels.

The invention has for its object to provide a spring tire of this character so constructed that it will impart to the wheel the necessary resiliency characteristic of a wheel equipped with the usual pneumatic tire, but at the same time eliminating the objectionable features of a pneumatic tire, namely, the blowing out and puncturing of the same.

With these and other objects in view, this invention resides in the novel features of construction, formation, combinations and arrangements of parts to be hereinafter more fully described, claimed and illustrated in the accompanying drawing, in which:—

Figure 1:
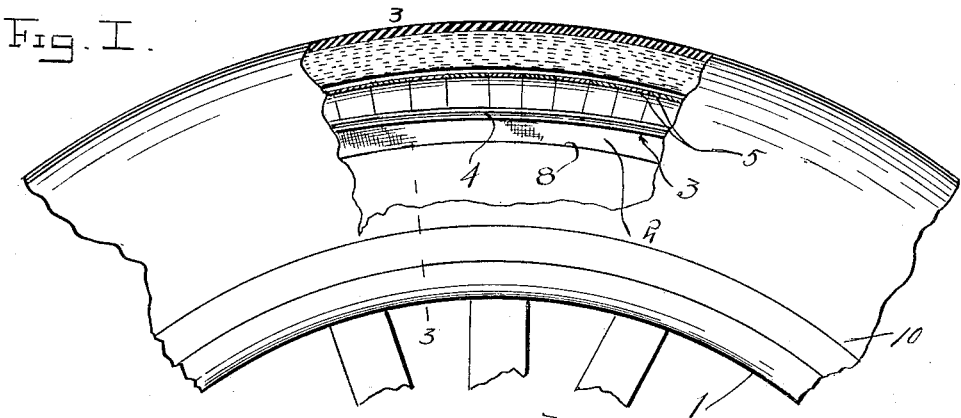
Figure 2:
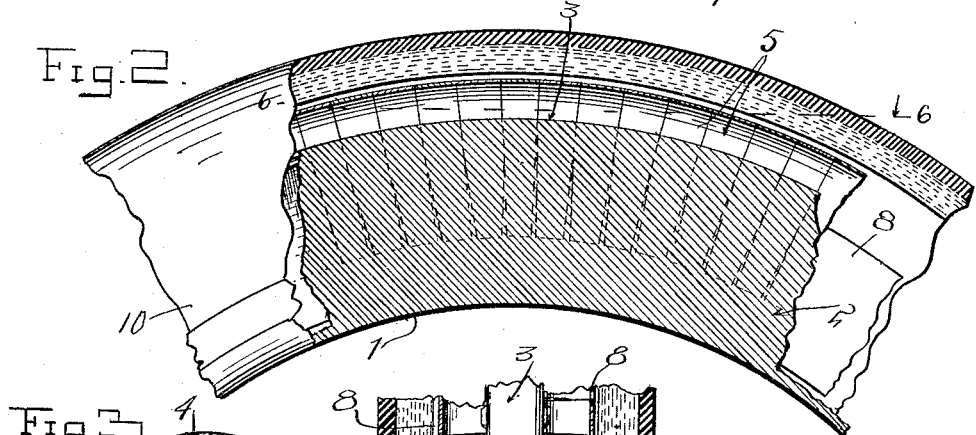
Figure 3:
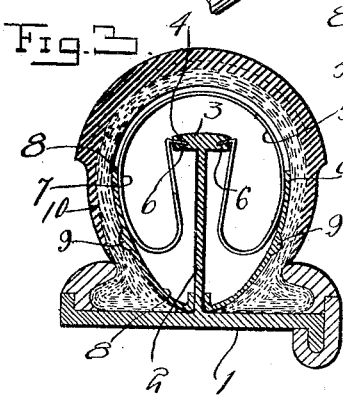
Figure 6:
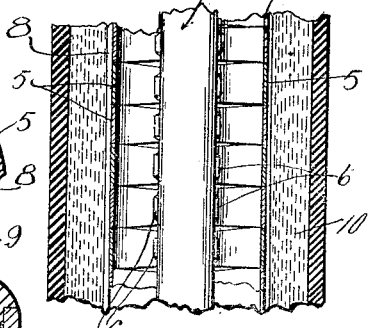
Figure 5:
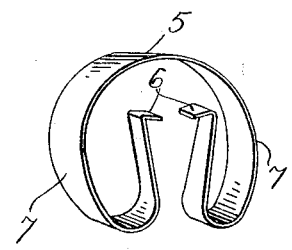
Figure 4:
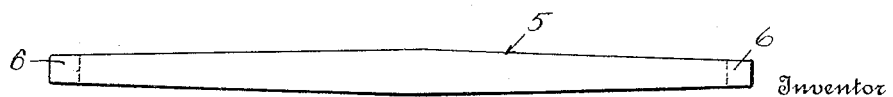

Figure 1 is a fragmentary side elevation of a wheel equipped with the tire. Fig. 2 is a longitudinal sectional view through the same. Fig. 3 is a sectional view on line 3—3 of Fig. 1. Fig. 4 is a plan view of one of the springs. Fig. 5 is a detail perspective view of the same. Fig. 6 is a sectional view on line 6—6 of Fig. 2.

Referring to the drawing, the numeral 1 designates the rim, which may be of the conventional form and around which is integrally formed a web 2, the outer edge of which is provided with continuous flanges 3, the edges of which are provided with inclined grooves 4, the purpose of which will appear later.

The spring plates 5 are formed from sheet steel and gradually taper toward their ends which terminate in angularly disposed ears 6, said plates being so bent as to be substantially semi-circular in cross section, so that the ends 7 thereof may be bowed so that the ears 6 formed upon said ends will engage the inclined grooves 4 formed in the flanges 3, thus supporting the plates which are arranged with their edges abutting, and with their treads spaced from the flanges 3.

To limit lateral movement of the spring plates 5 steel plates 8 are provided, said plates having their inner edges secured to the base of the web 2, and are curved so as to lie adjacent the outer surface of the plates 5, as clearly shown in Fig. 3 of the drawing. The plates 8 are each provided with annular ribs 9 which are arranged in respect to the rim 1 so that the edges of the shoe or casing 10 may be more effectually clamped by the rim 1.

From the foregoing description it will be seen that a tire has been provided for automobile wheels which will impart to the same the required resiliency without the aid of the usual pneumatic tires, which are not only dangerous but the up-keep of which is expensive.

What is claimed is:—

1. In combination with a wheel rim, of a web surrounding the same, flanges formed upon the outer edge of the web, a plurality of transversely curved spring plates having their ends bowed, means for connecting the bowed ends of said plates to the flange, and curved plates having their inner edges secured to the base of the web and slidably engaged by the spring plates, said curved plates serving to limit the lateral movement of the spring plates.

2. In combination with a wheel rim, of a web surrounding the same, continuous flanges formed integral with the outer edge of the web, inclined continuous slots formed in the edges of the flanges, a plurality of transversely curved plates having their ends gradually tapered and terminating in angularly disposed ears adapted to engage said grooves when the ends of the plates are bowed, and means carried by the web to limit the lateral movement of the spring plates, and a casing inclosing the spring plates, said casing being connected to the rim.

In testimony whereof, I affix my signature, in presence of two witnesses.

HUGH B. BRYAN.

Witnesses:
WM. COSTELLO,
ED. M. ELMLOCK.

---

Copies of this patent may be obtained for five cents each, by addressing the "Commissioner of Patents, Washington, D. C."